(12) United States Patent
Auner et al.

(10) Patent No.: US 9,040,009 B2
(45) Date of Patent: May 26, 2015

(54) KINETICALLY STABLE CHLORINATED POLYSILANES AND PRODUCTION THEREOF

(75) Inventors: Norbert Auner, Glashuetten (DE); Christian Bauch, Muldenstein (DE); Sven Holl, Gueckingen (DE); Rumen Deltschew, Leipzig (DE); Javad Mohsseni, Bitterfeld-Wolfen (DE); Gerd Lippold, Leipzig (DE); Thoralf Gebel, Dresden (DE)

(73) Assignee: Spawnt Private S.à.r.l. (LU)

( * ) Notice: Subject to any disclaimer, the term of this patent is extended or adjusted under 35 U.S.C. 154(b) by 144 days.

(21) Appl. No.: 13/513,018

(22) PCT Filed: Dec. 6, 2010

(86) PCT No.: PCT/EP2010/068991
§ 371 (c)(1),
(2), (4) Date: Aug. 28, 2012

(87) PCT Pub. No.: WO2011/067415
PCT Pub. Date: Jun. 9, 2011

(65) Prior Publication Data
US 2013/0001467 A1    Jan. 3, 2013

(30) Foreign Application Priority Data
Dec. 4, 2009  (DE) .......................... 10 2009 056 731

(51) Int. Cl.
| | | |
|---|---|---|
| C01B 33/08 | (2006.01) | |
| C08G 77/60 | (2006.01) | |
| C01B 33/04 | (2006.01) | |
| C01G 17/00 | (2006.01) | |
| C08G 79/14 | (2006.01) | |

(52) U.S. Cl.
CPC ............... *C08G 77/60* (2013.01); *C01B 33/04* (2013.01); *C01G 17/00* (2013.01); *C08G 79/14* (2013.01)

(58) Field of Classification Search
USPC .................................. 423/342, 343, 341, 344
See application file for complete search history.

(56) References Cited

U.S. PATENT DOCUMENTS

| | | |
|---|---|---|
| 3,378,344 A | 4/1968 | Horn et al. |
| 3,401,183 A | 9/1968 | Berger |
| 3,704,261 A | 11/1972 | Berger et al. |
| 3,926,833 A | 12/1975 | Hoffman et al. |
| 4,200,621 A | 4/1980 | Liaw et al. |
| 4,295,986 A | 10/1981 | Gordon |
| 4,312,849 A | 1/1982 | Kramer |
| 4,374,110 A | 2/1983 | Darnell et al. |
| 4,407,783 A | 10/1983 | Ulmer et al. |
| 4,499,063 A | 2/1985 | Grosbois et al. |
| 4,529,707 A | 7/1985 | Cowles et al. |
| 4,601,798 A | 7/1986 | Jacubert et al. |
| 4,629,801 A | 12/1986 | Soula et al. |
| 4,639,361 A | 1/1987 | Aono et al. |
| 4,725,419 A | 2/1988 | Marlett et al. |
| 4,755,370 A | 7/1988 | Kray et al. |
| 4,762,808 A | 8/1988 | Sharp et al. |
| 4,777,023 A | 10/1988 | Fieselmann |
| 4,824,657 A | 4/1989 | Jadhav |
| 4,837,376 A | 6/1989 | Schwirtlich et al. |
| 4,855,120 A | 8/1989 | Marlett |
| 5,061,470 A | 10/1991 | Park |
| 5,126,473 A | 6/1992 | Klockner et al. |
| 5,455,367 A | 10/1995 | Klein et al. |
| 8,722,913 B2 | 5/2014 | Lang et al. |
| 2007/0078252 A1 | 4/2007 | Dioumaev |
| 2009/0169457 A1 | 7/2009 | Auner et al. |
| 2010/0221169 A1 | 9/2010 | Knies et al. |
| 2011/0150740 A1 | 6/2011 | Auner et al. |
| 2011/0284796 A1 | 11/2011 | Auner et al. |
| 2012/0308464 A1 | 12/2012 | Bauch et al. |

FOREIGN PATENT DOCUMENTS

| | | |
|---|---|---|
| BE | 890.365 | 1/1982 |
| CA | 1 189 286 | 6/1985 |
| CA | 2726003 | 11/2010 |
| CN | 101107196 | 1/2008 |
| DE | 340912 | 9/1921 |
| DE | 1049835 | 12/1956 |
| DE | 1 034 159 | 7/1958 |
| DE | 1 055 511 | 4/1959 |
| DE | 1 085 505 | 7/1960 |
| DE | 1 096 341 | 1/1961 |
| DE | 1 098 931 | 2/1961 |
| DE | 1 187 614 | 2/1965 |
| DE | 29 29 089 | 1/1980 |
| DE | 33 42 496 | 6/1985 |
| DE | 35 06 071 | 8/1985 |
| DE | 36 35 064 | 4/1988 |
| DE | 43 13 130 | 5/1994 |
| DE | 43 06 106 | 9/1994 |
| DE | 108077 | 4/1998 |
| DE | 198 12 587 | 9/1999 |
| DE | 103 37 309 | 3/2005 |
| DE | 10 2005 024 041 | 11/2006 |

(Continued)

OTHER PUBLICATIONS

Akhtar, M., "Preparation of Ultra-High Purity Higher Silanes and Germanes," *Synthesis and Reactivity in Inorganic, Metal-Organic, and Nano-Metal Chemistry*, 1986, vol. 16, No. 5, pp. 729-748.

(Continued)

*Primary Examiner* — Edward Johnson
(74) *Attorney, Agent, or Firm* — DLA Piper LLP (US)

(57) ABSTRACT

Kinetically stable halogenated polysilanes include mixture of compounds having respectively at least four silicon atoms bound together, the substituents thereof comprising chlorine, and chlorine and hydrogen, and in the composition thereof, the atomic ratio of substituent to silicon is at least 1:1, wherein a) the kinetically stable halogenated polysilanes have a kinetically high stability in relation to oxidative splitting by chlorine, and the degree of conversion at temperatures of 120° C. within 10 hours with an excess of chlorine gas at 1013 hPa does not exceed 30 mol %, and b) the kinetically stable halogenated polysilanes have a percentage of branching points in the polysilane molecules of more than 8 mol %.

28 Claims, 3 Drawing Sheets

(56) References Cited

FOREIGN PATENT DOCUMENTS

| | | |
|---|---|---|
| DE | 10 2007 007 874 | 8/2008 |
| DE | 10 2008 025 260 | 12/2009 |
| DE | 10 2008 025 261 | 12/2009 |
| DE | 102008025263 | 12/2009 |
| DE | 10 2008 036 143 | 2/2010 |
| DE | 10 2009 056 731 | 6/2011 |
| EP | 0 007 063 | 1/1980 |
| EP | 0 052 808 | 6/1982 |
| EP | 0 054 650 | 6/1982 |
| EP | 0 105 778 | 4/1984 |
| EP | 0 111 924 | 6/1984 |
| EP | 0 192 528 | 8/1986 |
| EP | 0 300 320 | 1/1989 |
| EP | 0 316 472 | 5/1989 |
| EP | 0 412 342 | 2/1991 |
| EP | 1 867 604 | 12/2007 |
| FR | 1429930 | 1/1966 |
| GB | 793718 | 4/1958 |
| GB | 823483 | 11/1959 |
| GB | 823496 | 11/1959 |
| GB | 832333 | 4/1960 |
| GB | 851962 | 10/1960 |
| GB | 909950 | 11/1962 |
| GB | 922879 | 4/1963 |
| GB | 1110627 | 4/1968 |
| JP | 57-135712 | 8/1982 |
| JP | 58-500895 | 6/1983 |
| JP | 58-156522 | 9/1983 |
| JP | 59-500416 | 3/1984 |
| JP | 61-191512 | 8/1986 |
| JP | 61-205614 | 9/1986 |
| JP | 1-234316 | 9/1989 |
| JP | 4-130010 | 5/1992 |
| JP | 2002-246384 | 8/2002 |
| JP | 2009-543828 | 12/2009 |
| JP | 2010-111544 | 5/2010 |
| JP | 2011-520762 | 7/2011 |
| JP | 2011-523926 | 8/2011 |
| JP | 2013-512840 | 4/2013 |
| WO | 81/03168 | 11/1981 |
| WO | 82/04434 | 12/1982 |
| WO | 84/02332 | 6/1984 |
| WO | 03/010090 | 2/2003 |
| WO | 2005/015609 | 2/2005 |
| WO | 2006/125425 | 11/2006 |
| WO | 2007/062056 | 5/2007 |
| WO | 2007/062096 | 5/2007 |
| WO | 2008/009473 | 1/2008 |
| WO | 2008/035799 | 3/2008 |
| WO | 2008/051328 | 5/2008 |
| WO | 2009/047238 | 4/2009 |
| WO | 2009/143823 | 12/2009 |
| WO | 2009/143824 | 12/2009 |
| WO | 2009/143825 | 12/2009 |
| WO | 2011/067413 | 6/2011 |
| WO | 2011/067416 | 6/2011 |

OTHER PUBLICATIONS

Andrews, T.D. et al., "Further Studies on the Silicon-Germanium Hydrides," *J. Chem. Soc. (A)*, 1966, pp. 46-48.

Beattie, I.R. et al., "The Crystal Structure and Raman Spectrum of $Ge_5Cl_{12} \cdot GeCl_4$ and the Vibrational Spectrum of $Ge_2Cl_6$," *Inorg. Chem.*, 1998, vol. 37, pp. 6032-6034.

Bellama, J.M. et al., "Synthesis of the Hydrides of Germanium, Phosphorus, Arsenic, and Antimony by the Solid-Phase Reaction of the Corresponding Oxide with Lithium Aluminum Hydride," *Inorg. Chem.*, 1968, vol. 7, No. 10, pp. 2070-2072.

Bethke, G.W. et al., "Vibrational Spectrum of Disilane," *The Journal of Chemical Physics*, May 1957, vol. 26, No. 5, pp. 1107-1117.

Chen, J.M. et al., "X-Ray Initiated Molecular Photochemistry of Cl-Containing Absorbates on a Si(1<ce:hsp sp="0.12"/>0<ce:hsp sp="0.12"/>0) Surface Using Synchrotron Radiation," *Surface Science*, 2006, vol. 600, No. 18, pp. 3544-3549.

Chizmeshya, V.G. et al., "Synthesis of Butane-Like SiGe Hydrides: Enabling Precursors for CVD of Ge-Rich Semiconductors," *J. Am. Chem. Soc.*, 2006, vol. 128, pp. 6919-6930.

Dennis, L.M. et al., "Germanium. XXVII. Germanium Dichloride," *Journal of the American Chemical Society*, Apr. 1929, vol. 51, pp. 1151-1154.

Dennis, L.M. et al., "Germanium. VII. The Hydrides of Germanium," *Journal of the American Chemical Society*, Mar. 1924, vol. 46, pp. 657-674.

Dennis, L.M. et al., "Germanium. XXIX. Germanium Monohydride," *Journal of the American Chemical Society*, Jun. 1930, vol. 52, pp. 2369-2372.

Drake, J.E. et al., "The Preparation and Identification of Volatile Germanes," *Proceedings of the Chemical Society*, Oct. 1961, pp. 379-380.

Drake, J.E. et al., "Hydrides of Germanium," *Journal of the American Chemical Society*, 1962, pp. 2807-2813.

Fehér, V.F. et al., "Die Darstellung von Germaniumwasserstoffen aus Magnesiumgermanid und Hydraziniumchlorid in wasserfreiem Hydrazin," *Zeitschrift für Anorganische und Allgemeine Chemie*, 1958, vol. 297, pp. 14-22 (English translation of Summary only).

Finholt, A.E. et al., "The Preparation and Some Properties of Hydrides of Elements of the Fourth Group of the Periodic System and of their. Organic Derivatives," *Journal of the American Chemical Society*, Nov. 1947, vol. 69, pp. 2692-2696.

Gaspar, P.P. et al., "Preparation of Trisilane by the Schlesinger Method," *Inorganic Chemistry*, May 1970, vol. 9, No. 5, pp. 1272-1273.

Gokhale, S.D. et al., "Synthesis of the Higher Silanes and Germanes," *J. Inorg, Nucl. Chem.*, 1965, vol. 27, pp. 1911-1916.

Häberle, K. et al., "XVI*. Synthase αω-Dichlorierter Polygermane $Cl(Ph_2Ge)_nCl(n= 2,3,4,)$ Durch Germylen-Einschub," *Journal of Organometallic Chemistry*, 1986, vol. 312, pp. 155-165 (English translation of summary only).

Jolly, W.L. et al., "Electric Discharge Reactions of Phosphorus Trichloride and Germanium Tetrachloride," *Inorganic Chemistry*, Nov. 1962, vol. 1, No. 4, pp. 958-960.

Mackay, K.M. et al., "Studies on the Isomers of Pentagermane and Tetragermane," *J. Chem. Soc. (A)*, 1968, pp. 2312-2316.

Mackay, K.M. et al., "Silicon-Germanium Hydrides, $Si_2GeH_8$ and $SiGe_2H_8$," *J. Chem. Soc. (A)*, 1969, pp. 2937-2942.

Padma, D.K. et al., "Silicon Tetrafluoride: Preparation and Reduction with Lithium Aluminum Hydride," *Journal of Fluorine Chemistry*, 1979, vol. 14, pp. 327-329.

Ritter, C.J. et al., "Synthesis and Fundamental Studies of $(H_3Ge)_xSiH_{4-x}$ Molecules: Precursors to Semiconductor Hetero- and Nanostructures on Si," *J. Am. Chem. Soc.*, 2005, vol. 127, No. 27, pp. 9855-9864.

Royen, P. et al., "Zur Darstellung gemischter, flüchtiger Hydride der 4. und 5. Hauptgruppe," *Zeitschrift für anorganische und allgemeine Chemie*, 346, 1966, pp. 290-294 (English translation of Summary only).

Schmeisser, V.M. et al., "Über das Siliciumdichlorid $[SiCl_2]_x^1$)," *Zeitschrift für anorganische und allgemeine Chemie*, 334, 1964, pp. 50-56 (English translation of Abstract and Summary only).

Shriver, D. et al., "The Microwave Synthesis of Digermanium Hexachloride," *Journal of the American Chemical Society*, Dec. 20, 1958, vol. 80, pp. 6692-6693.

Timms, P. L. et al., "The Silicon-Germanium Hydrides," *Journal of the Chemical Society*, 1964, pp. 1467-1475.

Timms, P.L. et al., "The Formation of Some Volatile Hydrides from Lower Oxides," *Inorganic Chemistry*, 1964, vol. 3, No. 4, pp. 606-607.

Amberger, E., *Angew. Chem.* 71, No. 11, 1959, pp. 372-373, w/ brief English summary.

Lobreyer, T. et al., *Angewandte Chemie* 105, No. 4 (1993), w/ brief English summary.

Royen, P. et al., ("Darstellung"), *Angew. Chem.* 76, No. 7, 1964, pp. 302-303, w/ brief English summary.

Varma, R. et al., *Angewandte Chemie* 76 (1964), p. 649, w/ brief English summary.

Royen, P. et al., *Zeitschrift für Anorganische und Allgemeine Chemie*, vol. 215 (1933), pp. 295-376, w/ brief English summary.

(56) References Cited

OTHER PUBLICATIONS

Royen, P. et al., *Zeitschrift für Anorganische und Allgemeine Chemie*, 211 (1933), pp. 412-422, w/ brief English summary.
Schwarz, R. et al., *Zeitschrift für Anorganische und Allgemeine Chemie 275* (1954), pp. 1-20, w/ brief English summary.
Jolly, W.L. et al., *Inorganic Syntheses* (1963), No, 7, pp. 34-44, w/ brief English summary.
Wartenberg, *Zeitschrift für Anorganische und Allgemeine Chemie*, (1956), 283, pp. 372-376, w/ brief English summary.
Angus, P.C. et al., *Journal of the Chemical Society*, Chemical Communications (1973), p. 127, w/ brief English summary.
Japanese Notice of Reasons for Refusal dated Jul. 4, 2014 from corresponding Japanese Application No. 2012-541537.
European Opposition dated Jul. 29, 2014 from corresponding European Application No. 10 787 124.6.
Hengge, E., "Inorganic Silicon Halides," *Halogen Chemistry*, 1967, vol. 2, pp. 169-232.
Martin, G., "Researches on Silicon-Compounds. Part VI.," *J. Chem. Soc.*, 1914, vol. 105, pp. 2836-2860.
Urry, G. "Recent Developments in the Chemistry of Perchloropolysilanes," *J. Inorg. Nucl. Chem.*, 1964, vol. 26, pp. 409-414.
Taiwan Examination Report dated May 2, 2014 from related Taiwan Application No. 099142320, along with its English translation.
Auner, N., "Von Sand und Sonne zu Elekrizität und Wasserstoff," *Forschung Frankfurt*, 2010, pp. 1-6 and one sheet of English summary.

Besson, A. et al., "Comptes Rendus Herbdomadaires des Séances de l" Académie des Sciences," Gauthier-Villars, 1909, cover, pp. 1-7 and one sheet of English summary.
Höfler, F. et al., "Die Perhalgenierten Isotetrasilane $Si_4Cl_{10}$," *Inorg. Nucl. Chem. Letters*, 1975, vol. 11, pp. 743-747 and one sheet of English summary.
Höfler, F. et al., "Darstellung und Eigenschaften einiger hochchlorierter Oligosilane," *Z. anorg. allg. Chem.*, 1977, pp. 1-8 and one sheet of English summary.
Kautsky, H. et al., "Die Anwendung von Hochspannungskurzchlußfunken zur chemischen Syntese," *Chemische Berichte*, 1956, cover, pp. 571-581 and one sheet of English summary.
"Prüfbericht Nr. A140002136" *AQura Analytical Solutions*, 1-2 and one sheet of English summary.
Schmeisser, M. et al., "Darstellung und chemisches Verhalten von Silliciumsubhalogeniden," Fortschritte der chemischen Forschung (Hafner et al.), 1967, cover, index, pp. 3-22 and one sheet of English summary.
Streitberger, H-J. et al., "Verdünnungsmittel," *Römpp Online*, 2014, pp. 1-2 and one sheet of English summary.
Vrandi-Piskou, D. et al., "Chromatographie en phase gazeuse des premiers membres de la série homologue SinCL2n+2," Journal of Chromatography, 1966, pp. 449-451 and one sheet of English summary.
"$^{29}$Si NMR-Spektrum von $Si_5Cl_{12}$ (mit Verunreinigungen durch $SiCl_4$)," one page and one sheet of English summary.

KINETICALLY STABLE CHLORINATED POLYSILANES AND PRODUCTION THEREOF

RELATED APPLICATIONS

This is a §371 of International Application No. PCT/EP2010/068991, with an international filing date of Dec. 6, 2010 (WO 2011/067415, published Jun. 9, 2011), which is based on German Patent Application No. 10 2009 056 731.3 filed Dec. 4, 2009, the subject matter of which is incorporated herein by reference.

TECHNICAL FIELD

This disclosure relates to kinetically stable halogenated polysilanes which on account of its particular kinetic stability are suitable for a multiplicity of applications.

BACKGROUND

M. Schmeisser and P. Voss, Zeitschrift für Anorganische und Allgemeine Chemie, volume 334, 1994, pages 50 to 56 disclose that polymeric silicon dichloride $[SiCl_2]_x$ can be at least partly degraded by a stream of chlorine, diluted with nitrogen in a volume ratio of 1:1, at a temperature of 60° C. As well as unreacted polymeric silicon dichloride, the subchlorides $Si_2Cl_6$ to $Si_5Cl_{12}$, in particular, could be isolated. However, only a part of the polymeric silicon dichloride was reacted. From 46.5 g of polymeric silicon dichloride as starting material, only 20 g of the subchlorides are obtained, which suggests that less than 50% of the starting material was reacted.

It could therefore be helpful to provide kinetically stable halogenated polysilane mixtures which exhibit increased stability toward, for example, degradation in oxidizing atmospheres.

SUMMARY

We provide a kinetically stable halogenated polysilanes including a mixture of compounds having more than three silicon atoms in the backbone with in each case at least four interconnected Si atoms whose substituents comprise chlorine or chlorine and hydrogen and in whose composition an atomic ratio of substituent to silicon is at least 1:1, where the polysilanes have a kinetically high stability toward oxidative cleavage by chlorine, with there being no reaction of the polysilanes to an extent of more than 30 mol %, at a temperature of 120° C. over 10 hours under excess chlorine gas at 1013 hPa, and the polysilanes have a fraction of branching sites in polysilane molecules of more than 8 mol %.

We also provide a kinetically stable halogenated polysilanes including a mixture of compounds having more than three silicon atoms in a backbone with in each case at least four interconnected Si atoms whose substituents comprise chlorine or chlorine and hydrogen and in whose composition an atomic ratio of substituent to silicon is at least 1:1, where the polysilanes have a kinetically high stability toward oxidative cleavage by chlorine, with there being no reaction of the polysilanes to an extent of more than 30 mol %, up to temperatures of 120° C. over the course of 10 hours under excess chlorine gas at 1013 hPa, the polysilanes are obtained by partial degradation of halogenated polysilanes which comprise either thermally prepared chlorinated polysilanes, or plasma-chemically prepared chlorinated polysilanes, and the partial degradation includes a chlorination and is carried but over a period of 4 hours to 29 hours under a pressure of 200 to 2000 hPa.

We further provide a process for preparing a kinetically stable halogenated polysilane mixture including partial degradation of halogenated polysilanes which have been prepared by a thermal and/or plasma-chemical process, where the partial degradation includes a chlorination, temperature during degradation is 60 to 140° C., and takes place at a pressure of 200 to 2000 hPa.

Figure 1A:
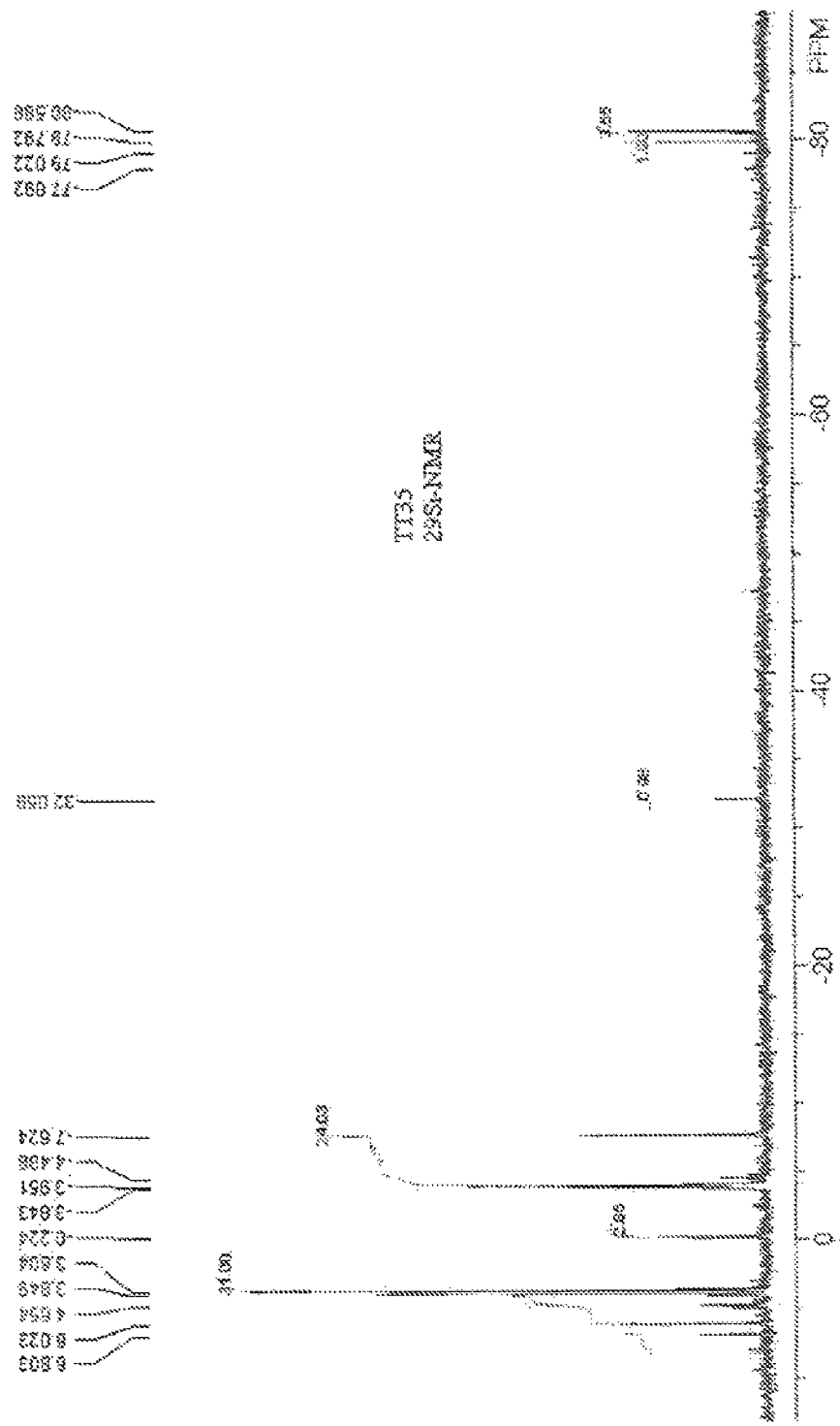
FIGS. 1A and 1B show a $^{29}$Si NMR spectrum of an inventive mixture of kinetically stable halogenated polysilanes which have been obtained by partial degradation, by chlorination, from halogenated polysilanes.

Kinetically stable halogenated polysilanes in the form of a mixture of compounds with in each case at least four interconnected silicon atoms whose substituents may comprise chlorine or chlorine and hydrogen and in whose composition the atomic ratio of substituent to silicon may be at least 1:1, where a) the polysilanes have a kinetically high stability toward oxidative cleavage by chlorine, with there being no reaction of the polysilanes to an extent of more than 30 mol %, preferably to an extent of more than 20 mol %, at a temperature of 120° C. over the course of 10 hours under excess chlorine gas at 1013 hPa, and b) the polysilanes having a fraction of branching sites in the polysilane molecules of more than 8 mol %, more particularly more than 11 mol %.

We found that an increased kinetic stability in halogenated polysilanes is governed by factors, including a high fraction of branching sites, of more than 8 mol % in the polysilane molecules. The fraction of the branching sites in the polysilane molecules can be determined by integrating the sharp significant $^{29}$Si NMR signals of tertiary and quaternary Si atoms which represent branchings from the main chain of a polysilane molecule. Tertiary silicon atoms with the formula Si—SiX(Si)—Si, and also quaternary silicon atoms of the formula Si—(Si)Si(Si)—Si, with X=chlorine or hydrogen, can be detected in $^{29}$Si NMR spectra by the significant product signals in shift ranges of −20 ppm to −33 ppm (tertiary silicon atoms) and −73 ppm to −93 ppm (quaternary silicon atoms).

These $^{29}$Si NMR spectra were recorded on a 250 MHz Bruker Avance 400 instrument with the zg30 pulse sequence, and referenced against tetramethylsilane (TMS) as external standard [δ($^{29}$Si)=0.0]. The acquisition parameters here are as follows: TD=65536, D1=20 s, NS=350, O1P=−50, and SW=300.

A chlorine gas excess is present when, in the reaction mixture for determining the kinetic stability of the halogenated polysilanes, free chlorine gas is constantly present in the sense that the solution is saturated with chlorine gas. This can be achieved by supplying the solution constantly with more chlorine gas than is simultaneously consumed by the reaction.

Sharp, significant product signals in $^{29}$Si NMR spectra are present when, with in each case at least four interconnected silicon atoms, the integral of the product signal is greater than 1% of the total integral of all the product signals in the $^{29}$Si NMR spectrum (significant product signals) and at the same time the full width at half maximum of the product signals is less than 10 Hz (sharp product signals).

On account of their high kinetic stability, the kinetically stable halogenated polysilanes can be used for applications hitherto inaccessible to the class of the halogenated polysilanes on account of side-reactions. Thus, for example, application of layers of halogenated polysilanes to substrates in strongly oxidizing atmospheres such as chlorine gas, for example, is possible by our kinetically stable polysilanes. Furthermore, the kinetically stable halogenated polysilanes obtained can be converted by derivatization into other polysilane derivatives which then in turn, on account of their particular stability, enter into fewer side-reactions as, for example, chain scissions. Some of the chlorinated polysilane fractions obtained have a high proportion of cyclic compounds and are therefore suitable for ring-opening polymerizations.

There is one particularly interesting fraction of the kinetically stable halogenated polysilanes, having a chain length of more than 3 Si atoms. This fraction can be isolated by fractional distillation from an as-obtained crude mixture of the kinetically stable halogenated polysilanes. $Si_2Cl_6$, for example, can be isolated by fractional distillation at 70 mbar and temperatures of not more than 130° C., and $Si_3Cl_8$ by distillation at 20 mbar and temperatures of less than 140° C., from the fraction with halogenated polysilanes having more than 3 silicon atoms.

In contrast to, for example, $Si_2Cl_6$, the long-chain fractions of the kinetically stable halogenated polysilanes having more than three silicon atoms are generally not available commercially. In the crude mixture of the kinetically stable halogenated polysilanes there may, depending on starting material, be 10% to 20% by weight of the particularly interesting fraction having more than three silicon atoms, and also about 80% to 90% by weight of the short-chain fraction with $Si_2Cl_6$ and $Si_3Cl_6$.

The kinetically stable halogenated polysilanes may have a fraction of less than 10 mol % of direct bonds between two secondary silicon atoms, with the formula —$SiX_2$—$SiX_2$— with X=chlorine or hydrogen.

We found that bonds between two secondary Si atoms can be cleaved with particular ease by an oxidizing atmosphere as, for example, chlorine gas by insertion of chlorine. This results in a reduced kinetic stability. The kinetically stable halogenated polysilanes may have a fraction of less than 10 mol % based on the silicon atoms involved in the bonding (product signals in the $^{29}Si$ NMR) of direct bonds between two secondary silicon atoms. Secondary Si atoms of this kind exhibit product signals in the case of chemical shifts of less than 0 ppm and −10 ppm in the case of relatively long-chain halogenated polysilanes (n>3).

The kinetically stable halogenated polysilanes may have less than 5 mol %, more preferably below 2 mol %, of direct bonds between two secondary Si atoms.

The kinetically stable halogenated polysilanes may continue to have bonds between a secondary silicon atom —$SiX_2$— and, for example, a tertiary Si atom —Si(Si)SiX— Si or a quaternary Si atom Si—(Si)Si(Si)—Si. Also possible are bonds between a secondary and a primary Si atom.

With further preference, the kinetically stable halogenated polysilanes have a kinetic stability with respect to oxidative cleavage by chlorine at temperatures of 120° C. over the course of 10 hours under chlorine gas excess at 1013 hPa which is such that there is no reaction to an extent of more than 20 mol %, preferably 15 mol %, and more preferably up to 10 mol %.

A method for determining the kinetic stability of the halogenated polysilane mixtures is carried out as follows:

The conversion rate of the kinetically stable halogenated polysilanes obtained by the test process, the oxidative cleavage by chlorine, can be calculated as follows. In a first step, the empirical formula of the material which will be subjected to chlorinating partial degradation by chlorine is ascertained. For this purpose a chloride determination, for example, the chloride determination according to Mohr is carried out and then the fraction of the hydrogen atoms is ascertained by integration of the peaks in a $^1H$ NMR spectrum. Silicon present in the starting substance can then be determined by differential weighing, thus giving an empirical formula of the material employed —$SiCl_{2.5}$, for example. After oxidative cleavage by chlorine that is carried out, the empirical formula can be determined in a similar way from the mixture then obtained, for example $SiCl_{2.8}$, the chloride content of the product being increased relative to the chloride content of the reactant as a result of chlorination.

If it is assumed that the formal thermodynamic end product of a complete chlorination is $SiCl_4$, then it is possible to represent both formulae of the starting compound and of the resultant product by addition of the starting compound and $SiCl_4$, as the thermodynamic end product of the reaction, as follows: $SiCl_{2.8}=a\times SiCl_{2.5}+SiCl_4$, where a and b added together make 1. Mathematically, this gives the equation 2.8=2.5a+4, where b=1−a. On the basis of this consideration, the formula 2.8=2.5a+4(1−a) is then obtained from which ultimately in this case a value of 0.8 is obtained for a, this meaning that in formal terms only 20 mol % of the $SiCl_{2.5}$ starting product has undergone reaction to become $SiCl_4$. This means that, in the case of a reaction rate of only 20 mol %, a kinetically stable halogenated polysilane is present in the form of a mixture.

Relative to each of the individual components as well, the mixture of the kinetically stable halogenated polysilanes has an increased solubility in various inert solvents such as, for example, cyclohexane, benzene, toluene or silicon tetrachloride, this being attributable to the fact that the various components of the kinetically stable halogenated polysilane mixture act mutually as solubilizers. A consequence of this is that halogenated polysilane mixtures with increased kinetic stability have better handling properties in comparison to the individual components.

In particular, the kinetically stable halogenated polysilane mixtures may be predominantly soluble in inert solvents with inert solvents used being aprotic, nonnucleophilic solvents such as aromatics and alkanes, for example. "Predominantly soluble" here means a solubility of more than 50% by mass.

The polysilane mixture may have a neopentachlorosilane, Neo-$Si_5Cl_{12}$, fraction of at least 10 mol %, more particularly more than 18 mol %, more preferably more than 25 mol %. Neopentachlorosilane is a branched-chain compound having a particularly high kinetic stability.

Furthermore, the halogenated polysilane mixtures with high kinetic stability may have an empirical formula $SiCl_x$ with x=2.2 to 2.5, more particularly=2.25 to 2.4.

The average chain length of the kinetically stable halogenated polysilanes having more than three silicon atoms in the backbone is n=4 to 10, preferably, n=4 to 8. Combining the empirical formula with the average chain length therefore gives an empirical formula $(SiCl_x)_n$ with n=4 to 10 and x=2.2 to 2.5, with the preferred parameter ranges identified earlier on above both for n and for x.

The polysilane mixtures of kinetically stable halogenated polysilanes in $^{29}Si$ NMR spectra may have sharp significant product signals in the chemical shift range of 15 ppm to −10 ppm (primary and secondary silicon atoms) and in the chemical shift range of −28 ppm to −35 ppm (tertiary silicon atoms) and in the chemical-shift range of −70 ppm to −82 ppm (quaternary silicon atoms). In relation to the tertiary and quaternary silicon atoms, preferred shift ranges contemplated are, in particular, −31 ppm to −33 ppm and −77 to −82 ppm. Signals within these shift ranges are characteristic of kinetically stable, halogenated polysilanes.

Especially in the chemical shift range for primary and secondary silicon atoms, the kinetically stable halogenated polysilane mixtures may have significant and sharp product signals in a chemical shift range of 8.5 ppm to 3 ppm, 1 ppm to −1 ppm, −3 ppm to −5 ppm, and −6 ppm to −8.63 ppm, or in combinations thereof.

More particularly, kinetically stable halogenated polysilane mixtures may each have at least the following number of significant sharp product signals in the following chemical shift regions: four signals in a chemical shift range of 7 to 3 ppm, one product signal in the chemical shift range of 1 to −1 ppm, one signal of −29.5 to −33 ppm, and two signals in the chemical shift range of −78 to −82 ppm.

Product signals of this kind are characteristic of a mixture of different primary and secondary, but also tertiary and quaternary silicon atoms in the halogenated polysilanes with high kinetic stability.

Furthermore, it is possible for the kinetically stable polysilane mixtures to comprise hydrogen substituents as well as chlorine substituents in which case the hydrogen content may also be less than 2 atom %, more particularly less than 1 atom %. The fraction of the hydrogen atoms in the kinetically stable halogenated, more particularly chlorinated, polysilanes may be determined, for example, by integration of the product signals and comparison of the resulting integrals with those of an internal standard in $^1$H NMR spectra.

Halogenated polysilanes which as well as chlorine substituents also have hydrogen substituents have characteristic product signals in 1H NMR spectra in chemical shift ranges of 6.5 to 3.5 ppm, more particularly 5.9 to 3.8 ppm.

The substituents of the kinetically stable halogenated polysilanes may consist exclusively of halogens, more particularly chlorine. "Consist" here means that less than 0.5 mol %, more preferably less than 0.05 mol %, of other substituents such as hydrogen, are present. The halogenated kinetically stable polysilane mixtures may be obtained as fine chemicals having a very high purity of at least 99.5%. The impurities may amount to less than 10 ppm.

For further characterization of the kinetically stable halogenated polysilanes it is also possible to record Raman spectra which were determined using an XY 800 spectrometer from Dilor with tunable laser excitation (T-sapphire laser, pumped by argon ion laser) and with confocal Raman and luminescence microscope, with liquid nitrogen-cooled CCD detector, measurement temperature being room temperature, and excitation wavelengths in the visible spectral range including 514.53 nm and 750 nm.

In the Raman spectrum, kinetically stable halogenated polysilanes may exhibit significant product signals at below 650 wavenumbers, more particularly between 270 and 350 and between 520 and 600 wavenumbers (cm$^{-1}$). Significant product signals in Raman spectra are defined as those product signals which exhibit more than 10% of the intensity of the highest peak in the Raman spectrum. We found that Raman spectra with significant product signals of this kind are attributable primarily to open-chain branched compounds, with virtually no cyclic compounds.

It is possible for kinetically stable halogenated polysilanes to have at least three significant product signals at 270 to 340 wavenumbers and at least two significant product signals at 540 to 640 wavenumbers.

The polysilane mixture here may be colorless to pale yellow or ivory in coloration. Where the kinetically stable halogenated polysilanes are of low viscosity and/or crystalline, the viscosity of the liquid faction at room temperature is less than 1000 mPa s, preferably less than 400 mPa s. Furthermore, the soluble fraction may be distillable and/or volatile without decomposition to an extent of more than 80% under reduced pressure, preferably 1 to 100. Pa.

Kinetically stable halogenated polysilanes in the form of a mixture of compounds having more than three silicon atoms in the backbone with in each case at least four interconnected silicon atoms whose substituents may comprise chlorine or chlorine and hydrogen and in whose composition the atomic ratio of substituent to silicon may be at least 1:1, where
  a) these, polysilanes have a kinetically high stability toward oxidative cleavage by chlorine, with there being no reaction of the polysilanes to an extent of more than 30 mol % at temperatures of 120° C. over the course of 10 hours under excess chlorine gas at 1013 hPa,
  b) these polysilanes are obtainable by a partial degradation of halogenated polysilanes which comprise either
    1. thermally prepared chlorinated polysilanes, or
    2. plasma-chemically prepared chlorinated polysilanes, and the partial degradation includes a chlorination which is carried but over a period of 4 hours to 29 hours under a pressure of 200 to 2000 hPa.

Halogenated polysilanes of this kind have the advantageous properties already identified earlier on above in relation to a high kinetic stability.

Starting compounds that may be used for a partial degradation by chlorination to form the kinetically stable halogenated polysilanes may include, for example, thermally prepared chlorinated polysilanes, of the kind described in WO 2009/143824 A1, the subject matter of which is incorporated herein by reference.

As thermally prepared polysilanes it is possible to use polysilanes each having at least one direct Si—Si bond, and whose substituents consist of halogen, more particularly chlorine, and in whose composition the atomic ratio of substituent to silicon is at least 1:1,
  where the polysilanes consist of rings and chains having a high fraction of branching sites, this fraction, based on the overall product mixture, being greater than 1 mol %, and
  which have a Raman molecular vibration spectrum which has an intensity ratio $I_{100}:I_{132} \leq 1$, where $I_{100}$ is the Raman intensity at 100 cm$^{-1}$ and $I_{132}$ is the Raman intensity at 132 cm$^{-1}$, and
  in $^{29}$Si NMR spectra the significant product signals are present in the chemical shift range of +23 ppm to −13 ppm, −18 ppm to −33 ppm, and −73 ppm to −93 ppm.

Alternatively or additionally, it is also possible to use plasma-chemically prepared polysilanes, of the kind described, for example, in WO 2009/143823 A2, the subject matter of which is incorporated herein by reference.

These plasma-chemically prepared polysilanes likewise have at least one direct Si—Si bond, and their substituents consist of halogen or halogen and hydrogen and in their composition the atomic ratio of substituent to silicon is at least 1:1, where
  a) the halogen is chlorine,
  b) the hydrogen content of the polysilane is less than 2 atom %, c) the polysilane contains virtually no short-chain branched chains and rings, with the amount of branching sites of the short-chain fraction, more particularly of the summed fraction of the perhalogenated derivatives of neohexasilane, neopentasilane, isotetrasilane, isopentasilane, perchloro-2,3-disilyltetrasilane, and isohexasilane, based on the overall product mixture, being less than 1 mol %, d) the Raman molecular vibration spectrum has an intensity of $I_{100}:I_{132}$ of >1, where $I_{100}$ is the Raman intensity at 100 cm$^{-1}$ and $I_{132}$ is the Raman intensity at 132 cm$^{-1}$, e) in $^{29}$Si NMR spectra it has its significant product signals in the chemical shift range of +15 ppm to −7 ppm.

Kinetically stable halogenated polysilane mixtures having chain lengths of n=2 to 10 are obtained preferably in the case of partial degradation of plasma-chemically prepared halogenated polysilanes, whereas with partial degradation of thermally prepared halogenated polysilanes the chain lengths of the kinetically stable halogenated polysilane mixtures are situated at n=2 to 8.

The partial degradation of the halogenated polysilanes to form the kinetically stable halogenated polysilanes may be carried out here preferably at temperatures of 60° C. to 140° C.

By partial degradation by a chlorination over a period of 4 hours to 29 hours under a pressure of 200 to 2000 hPa, it is possible to ensure that kinetically stable halogenated polysilanes are formed. In particular it is possible on the one hand to prevent excessively harsh chlorinating conditions causing the entire halogenated polysilane mixture used to be split into the possible end product SiCl$_4$ of Si$_2$Cl$_6$, but on the other hand it is also ensured that the polysilane mixtures formed by the chlorination have a sufficient kinetic stability. We therefore recognized that compliance with these specific reaction conditions during partial degradation of the halogenated polysilanes results in formation of kinetically stable halogenated polysilanes which open up entirely new fields of use relative to the conventional halogenated polysilanes.

We also provide a process for preparing a kinetically stable halogenated polysilane, mixture where a partial degradation of halogenated polysilanes which have been prepared by a thermal and/or plasma-chemical process is carried out, this partial degradation a) including a chlorination,
b) the temperature of the reaction is held at 60 to 140° C., preferably at 90 to 130° C., and
c) being operated under a pressure of 200 to 2000 hPa, preferably at 800 to 1500 hPa.

After partial degradation, the resulting crude mixture of kinetically stable halogenated polysilanes may be further subjected to a fractional distillation for isolation of a fraction of the resultant kinetically stable halogenated polysilanes with chain lengths n=2 and 3, in other words, hexachlorodisilane and octachlorotrisilane. This fractional distillation may be carried out, for example, under a pressure of 70 mbar with a bath temperature of 130° c. for isolation of Si$_2$C$_6$, and under a pressure of 20 mbar and with a bath temperature of above 140° C. for isolation of Si$_3$Cl$_8$.

Furthermore, the halogenated polysilanes can be diluted prior to the partial degradation, in which case, preferably, SiCl$_4$, Si$_2$Cl$_6$ and/or Si$_3$Cl$_8$ are used as diluents. This dilution leads to a reduction in the viscosity, and this leads to a more effective chlorination during the partial degradation.

The kinetically stable halogenated polysilane mixtures, both with more than three silicon atoms with the backbone and with the additional fraction with hexachlorodisilane and octachlorotrisilane, are soluble predominantly—that is, to an extent of more than 50 percent by mass—in inert solvents, with inert solvents that can be used being, preferably, aprotic, nonnucleophilic solvents such as aromatics and alkanes as, for example, toluene, benzene, cyclohexane, and SiCl$_4$.

In the text below, our polysilanes and methods will be elucidated in more detail, using working examples and figures:

Working Example 1

33.02 g of plasma-chemically prepared perchloropolysilane are freed from diluents by low-temperature distillation and heated to 120° C. As a result of the increase in temperature, the viscous material becomes stirrable. With stirring, a stream of chlorine gas is passed over the liquid. Discharged material is condensed out in a cold trap at 0° C. The viscosity of the liquid decreases during the reaction. After 9.5 hours, the collected reaction products are fractionally distilled. $^{29}$Si NMR-spectroscopic analysis shows a little SiCl$_4$ and Si$_2$Cl$_6$ and also Si$_3$Cl$_8$ as main products. In the higher-boiling fractions it is possible to identify the perchlorinated derivatives of n-tetrasilane, of isotetrasilane, of neopentasilane, and of neohexasilane. N-Perchlorosilanes with a chain length >4 are not detectable.

Working Example 2

31.5 g of plasma-chemically prepared halogenated polysilanes are largely freed from diluents by low-temperature distillation and heated to 100° C. In the course of heating, the material becomes stirrable. With stirring, Cl$_2$ gas is added in portions against a buffer volume behind the apparatus. Discharged material condenses in a cold trap cooled to 0° C. During the reaction, the orange, viscous liquid becomes yellow and the viscosity goes down. The reaction time is 15 hours. The contents of the cold trap and of the reaction flask are combined and fractionally distilled. In the $^{29}$Si NMR spectra of the fractions it is possible to identify the same compounds as in Working Example 1. The amount of n-perchlorotetrasilane is reduced in comparison to Working Example 1.

Working Example 3

44.93 g of halogenated polysilanes prepared thermally by reaction of SiCl$_4$ with elemental Si are largely freed from SiCl$_4$ by low-temperature distillation and heated to 100° C. In the course of heating, the material becomes stirrable. With stirring, Cl$_2$ gas is introduced into the reaction mixture through a gas inlet tube in portions against a buffer volume behind the apparatus. Discharged material condenses in an attached cold trap that is cooled to 0° C. During the reaction, the orange, viscous liquid becomes yellow and the viscosity goes down. The reaction time is 11 hours. The contents of the cold trap and of the reaction flask are combined and fractionally distilled. In the $^{29}$Si NMR spectra of the fractions it is possible to identify the same compounds as in Working Example 1.

Working Example 4

A solution of 3052.7 g of plasma-chemically prepared PCS in SiCl$_4$ is admixed with 1388.7 g of Si$_2$Cl$_6$, and SiCl$_4$ is removed by distillation. The solution is heated to 60° C. With stirring, Cl$_2$ gas is introduced into the solution through a gas inlet tube with glass frit against a buffer volume behind the apparatus. Discharged material condenses in an attached cold trap cooled to 0° C. As a result of the heat of reaction, the temperature of the solution rises. By closed-loop regulation of the heating bath temperature and regulation of the amount of chlorine gas introduced, the temperature of the reaction solution is held between 110° C. and 120° C. During the reaction, the pressure in the apparatus is between 1013 hPa and 1213 hPa. Over the course of 12 hours, the solution, which is initially an intense orange-red, takes on a yellow coloration. Thereafter, there is a distinct decrease in the absorption of chlorine by the reaction mixture. After 25.5 hours, the reaction is ended and $SiCl_4$, $Si_2Cl_6$ and the major part of the $Si_3Cl_8$ are separated by distillation from the reaction products. In the $^{29}Si$ NMR spectra of the fractions removed by separation, it is possible to detect the anticipated compounds. Obtained are 760.1 g of $SiCl_4$ with small amounts of $Si_2Cl_6$, 3354.9 g of $Si_2Cl_6$, and 861.8 g of $Si_3Cl_8$ with small amounts of $Si_2Cl_6$.

Figure 1B:
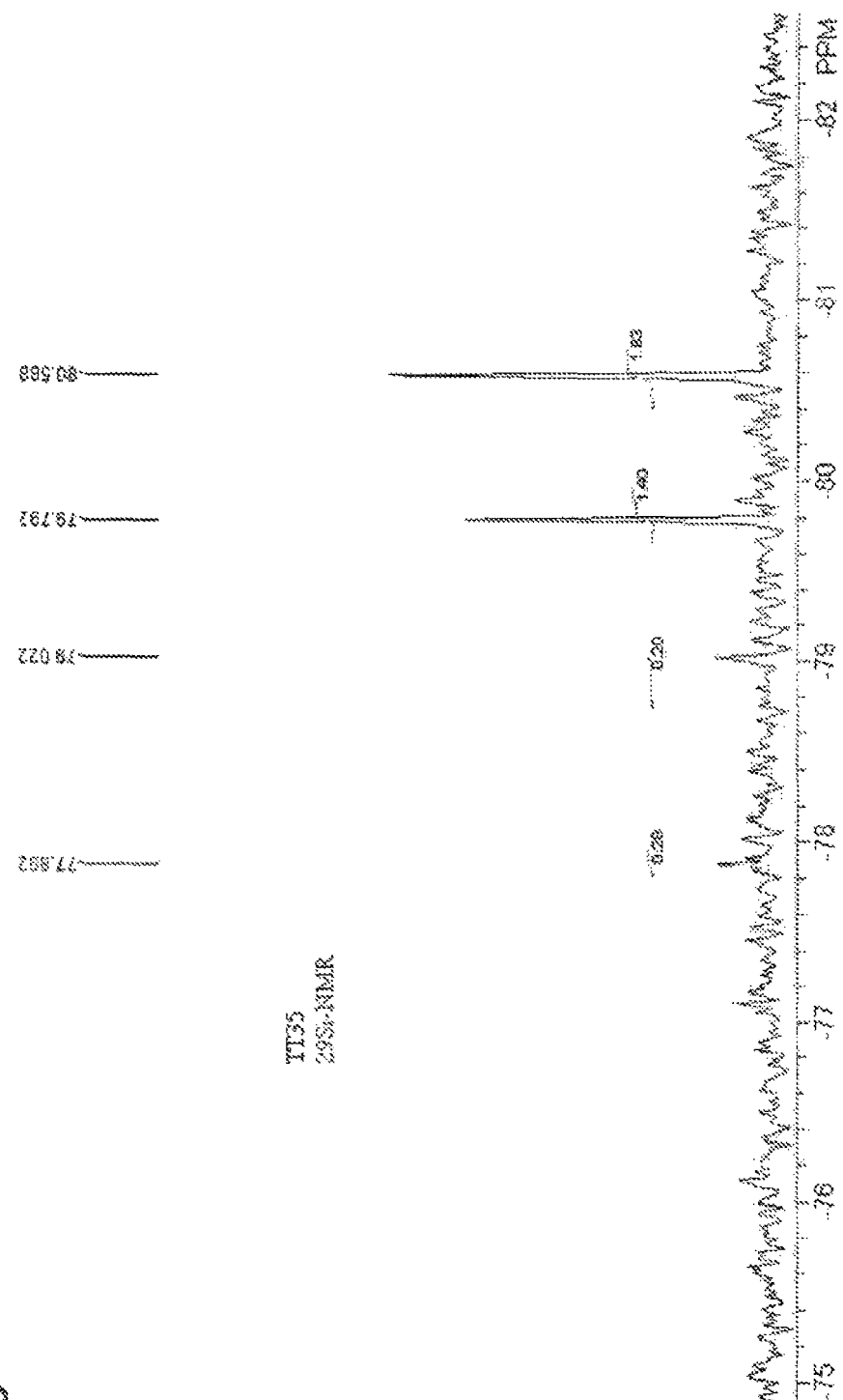

The distillation residue is 401.7 g. The $^{29}Si$ NMR spectrum of the distillation residue is shown in FIG. 1a, with FIG. 1b showing an enlarged section taken from this $^{29}Si$ NMR spectrum. Clearly apparent are the sharp significant product signals for the chemical shifts between +7 pmm and −8 ppm for the primary and secondary Si atoms, the product signals of about −32 ppm for the tertiary Si atoms, and the product signals between −77 ppm and −81 ppm for the tertiary Si atoms.

Figure 2:
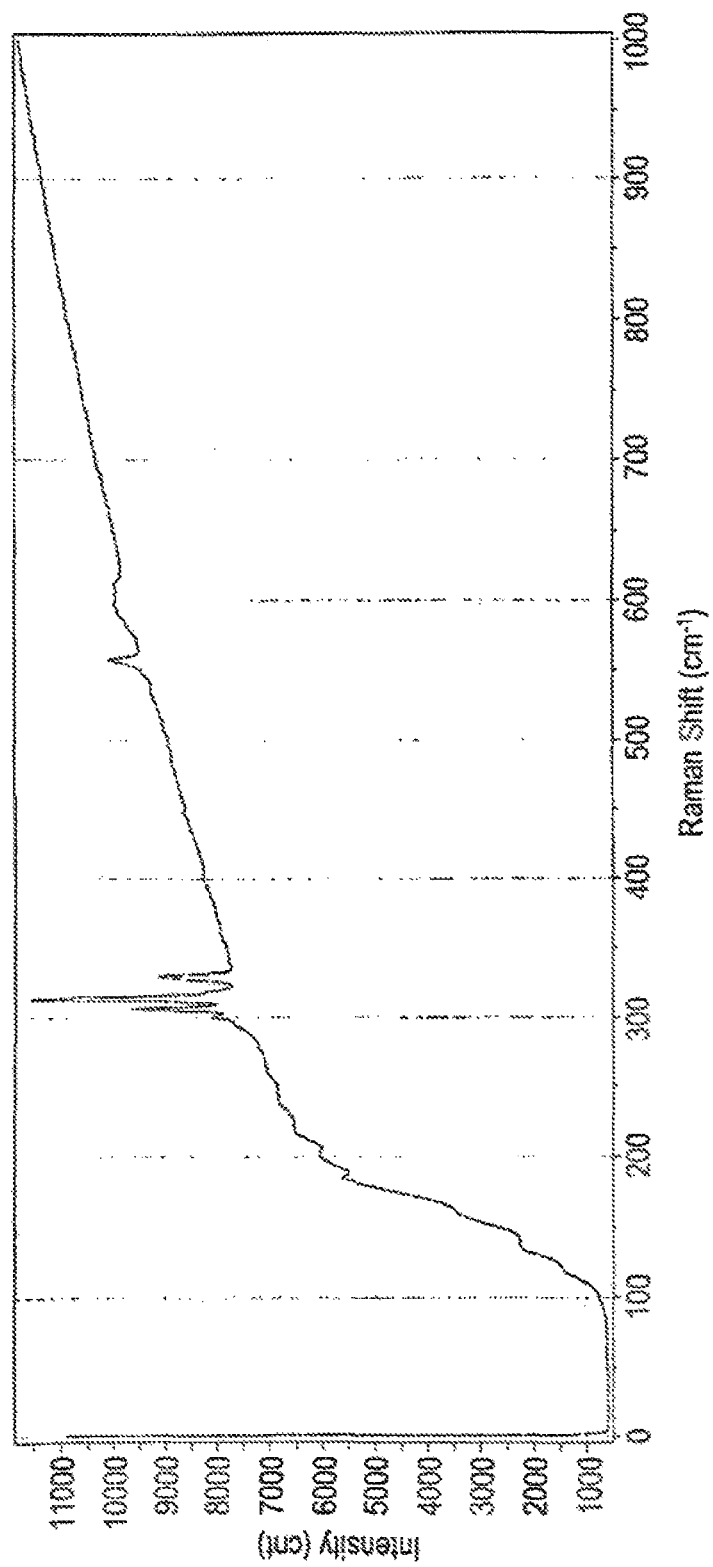
FIG. 2 shows a Raman spectrum of the same polysilane mixture as in FIGS. 1A and 1B.

FIG. 2 shows the Raman spectrum of the distillation residue. The product signals between about 290 to 350 $cm^{-1}$ and between 520 and 640 $cm^{-1}$ are readily apparent.

Working Example 5

A solution of 3933.7 g of plasma-chemically prepared PCS in $SiCl_4$ is admixed with 765.9 g of $Si_3Cl_8$, and $SiCl_4$ is removed by distillation. The solution is heated to 60° C. With stirring, $Cl_2$ gas is introduced into the solution through a gas inlet tube with glass frit against a buffer volume behind the apparatus. Discharged material condenses in an attached cold trap cooled to 0° C. As a result of the heat of reaction, the temperature of the solution rises. By closed-loop regulation of the heating bath temperature and regulation of the amount of chlorine gas introduced, the temperature of the reaction solution is held between 110° C. and 120° C. During the reaction, the pressure in the apparatus is between 1013 hPa and 1213 hPa. Over the course of 17 hours, the solution, which is initially an intense orange-red, acquires a yellow coloration. Thereafter, there is a significant decrease in the absorption of chlorine by the reaction mixture. After 29 hours, the reaction is ended and $SiCl_4$, $Si_2Cl_6$, and the major part of the $Si_3Cl_8$ are separated from the reaction product by distillation. In the $^{29}Si$ NMR spectra of the fractions removed by separation it is possible to detect the anticipated compounds. The spectrum of the distillation residue corresponds to FIGS. 1a and 1b. The amount of the $Si_3Cl_8$ fraction isolated, at 649.9 g, is lower than the amount introduced.

Working Example for a Test Chlorination for Determining the Kinetic Stability

In an apparatus with 100 g of a mixture of kinetically stable chlorosilanes obtained by chlorinating plasma-chemically prepared polychlorosilane for longer than 10, first of all, inert gas is displaced by vigorous, introduction of $Cl_2$ gas at room temperature. Thereafter, the apparatus is closed and heated to 120° C. with stirring, and further chlorine gas is introduced into the reaction mixture through a gas inlet tube in portions against a buffer volume behind the apparatus. Discharged material condenses in an attached cold trap cooled to 0° C. During the reaction, the pressure in the apparatus is held between 1013 hPa and 1213 hPa. After a reaction time of 10 hours, a comparison with the $^{29}Si$ NMR spectra shows an increase of $SiCl_4$ and $Si_2Cl_6$ in the solution, whereas the signals for $Si_3Cl_8$ have become weaker, and residues of $n\text{-}Si_4Cl_{10}$ are no longer in evidence. A comparative distillative work-up of starting material and reaction product shows a decrease in the $Si_3Cl_8$ fraction by about 20% by weight, while the distillation residue, composed of kinetically stable chlorinated polysilanes having a chain length n≥4, has hardly changed in its weight. The low-boiling fractions, in contrast, which consist of primarily $SiCl_4$ or $Si_2Cl_6$, have an increased weight.

The invention claimed is:

1. Kinetically stable halogenated polysilanes comprising a mixture of compounds having more than three silicon atoms in the backbone with in each case at least four interconnected Si atoms whose substituents comprise chlorine or chlorine and hydrogen and in whose composition an atomic ratio of substituent to silicon is at least 1:1, where
    a) the polysilanes have a kinetically high stability toward oxidative cleavage by chlorine, with there being no reaction of the polysilanes to an extent of more than 30 mol %, at a temperature of 120° C. over 10 hours under excess chlorine gas at 1013 hPa, and
    b) the polysilanes have a fraction of branching sites in polysilane molecules of more than 8 mol %.

2. The polysilanes according to claim 1, having a fraction of $neo\text{-}Si_5Cl_{12}$ of at least 10 mol %.

3. The polysilanes according to claim 1, having an empirical formula $SiCl_x$ with x=2.2 to 2.5.

4. The polysilanes according to claim 1, having an average chain length of n equals 4 to 10.

5. The polysilanes according to claim 1, wherein $^{29}Si$ NMR spectra exhibits sharp significant product signals in a chemical shift range of 15 ppm to −10 ppm, and in chemical shift range of −28 to −35 ppm, and in a chemical shift range of −70 to −85 ppm.

6. The polysilanes according to claim 5, where the sharp significant product signals in $^{29}Si$ NMR spectra are present in a chemical shift range selected from the group consisting of 8.5 ppm to 3 ppm, 1 ppm to −1 ppm, −3 to −5 ppm, and −6 ppm to −8.3 ppm, or combinations thereof.

7. The polysilanes according to claim 1, wherein $^{29}Si$ NMR spectra possesses in each case at least a number of significant sharp product signals in the following chemical shift ranges: four signals of 7 to 3 ppm, one signal of 1 to −1 ppm, one signal of −29.5 to −33 ppm, two signals of −78 to −82 ppm.

8. The polysilanes according to claim 1, further comprising hydrogen substituents.

9. The polysilanes according to claim 8, wherein the hydrogen content is less than 2 atom %.

10. The polysilanes according to claim 8, wherein $^1H$ NMR spectra has product signals in the chemical shift range of 6.5 to 3.55 ppm.

11. The polysilanes according to claim 1, wherein Raman spectra possesses significant product at below 650 wavenumbers and between 520 and 640 wavenumbers.

12. The polysilanes according to claim 1, wherein Raman spectra possesses at least three significant product signals at 270 to 340 wavenumbers and at least two significant product signals at 540 to 640 wavenumbers.

13. The polysilanes according to claim 1, which are colorless to pale yellow or ivory.

14. The polysilanes according to claim 1, obtained in low-viscosity and/or crystalline form, the viscosity of a liquid fraction at RT being less than, 1000 mPa s.

15. The polysilanes according to claim 1, which are predominantly soluble in inert solvents.

16. The polysilanes according to claim 1, wherein the soluble fraction is distillable and/or volatile without decomposition to an extent of more than 80% under reduced pressure of 1 to 100 Pa.

17. The polysilanes according to claim 1, wherein the substituents consist of chlorine.

18. The polysilanes according to claim 1, further comprising a fraction of halogenated polysilanes having a chain length n=2 to 3 ($Si_2Cl_6$ and $Si_2Cl_8$, readily separable from the higher-chain polysilanes by distillation).

19. The polysilanes according to claim 18, having a stoichiometric formula $SiCl_x$ with x=2.2 to 2.5.

20. The polysilanes according to claim 1, containing a fraction of less than 10 mol % of direct bonds between two secondary Si atoms.

21. Kinetically stable halogenated polysilanes comprising a mixture of compounds having more than three silicon atoms in a backbone with in each case at least four interconnected Si atoms whose substituents comprise chlorine or chlorine and hydrogen and in whose composition an atomic ratio of substituent to silicon is at least 1:1, where
  a) the polysilanes have a kinetically high stability toward oxidative cleavage by chlorine, with there being no reaction of the polysilanes to an extent of more than 30 mol %, up to temperatures of 120° C. over the course of 10 hours under excess chlorine gas at 1013 hPa,
  b) the polysilanes are obtained by partial degradation of halogenated polysilanes which comprise either
    1. thermally prepared chlorinated polysilanes, or
    2. plasma-chemically prepared chlorinated polysilanes, and the partial degradation includes a chlorination and is carried out over a period of 4 hours to 29 hours under a pressure of 200 to 2000 hPa.

22. The polysilanes according to claim 21, where the thermally prepared polysilanes have in each case at least one direct Si—Si bond, and their substituents consist of halogen and in their composition an atomic ratio of substituent to silicon is at least 1:1, the polysilanes consisting of rings and chains having a high fraction of branching sites, the fraction, based on overall product mixture, being >1 mol %, and said polysilanes having a RAMAN molecular vibration spectrum of $I_{100}/I_{132}<1$, where $I_{100}$ is the Raman intensity at 100 cm$^{-1}$ and $I_{132}$ is the Raman intensity at 132 cm$^{-1}$, and in $^{29}$Si NMR spectra significant product signals are present in the chemical shift range of +23 ppm to −13 ppm, −18 ppm to −33 ppm and −73 ppm to −93 ppm, or the plasma-chemically prepared polysilanes have at least one direct Si—Si bond and their substituents consist of halogen or of halogen and hydrogen and in their composition an atomic ratio of substituent to silicon is at least 1:1, where a) the halogen is chlorine, b) the hydrogen content of the polysilane is less than 2 atom %, c) the polysilane contains substantially no short-chain branched chains and rings, with an amount of branching sites of a summed fraction of perhalogenated derivatives of neohexasilane, neopentasilane, isotetrasilane, isopentasilane, and isohexasilane, based on overall product mixture, being less than 1 mol %, d) it has a RAMAN molecular vibration spectrum of $I_{100}/I_{132}>1$, where $I_{100}$ is the Raman intensity at 100 cm$^{-1}$ and $I_{132}$ is the Raman intensity at 132 cm$^{-1}$, e) in $^{29}$Si NMR spectra it has its significant product signals in the chemical shift range of +15 ppm to −7 ppm.

23. The polysilanes according to claim 21, where the partial degradation is carried out at temperatures of 60° C. to 140° C.

24. A process for preparing a kinetically stable halogenated polysilane mixture according to claim 1, comprising partial degradation of halogenated polysilanes which have been prepared by a thermal and/or plasma-chemical process, where the partial degradation
  a) includes a chlorination,
  b) temperature during degradation is 60 to 140° C., and
  c) takes place at a pressure of 200 to 2000 hPa.

25. The process according to claim 24, wherein, after the partial degradation, further comprising distillation to remove a fraction of the kinetically stable halogenated polysilanes formed with chain lengths n=2 and 3.

26. The process according to claim 24, where the halogenated polysilanes are diluted prior to the partial degradation with $SiCl_4$, $Si_2Cl_6$ and/or $Si_3Cl_8$ as diluents.

27. The process according to claim 24, wherein as polysilanes which have been prepared by a thermal process, polysilanes are used which in each case have at least one direct Si—Si bond, and whose substituents consist of halogen, and in whose composition an atomic ratio of substituent to silicon is at least 1:1, the polysilanes consisting of rings and chains having a high fraction of branching sites, the fraction, based on the overall product mixture, being >1 mol %, said polysilanes having a RAMAN molecular vibration spectrum of $I_{100}/I_{132}<1$, where $I_{100}$ is the Raman intensity at 100 cm$^{-1}$ and $I_{132}$ is the Raman intensity at 132 cm$^{-1}$, and in $^{29}$Si NMR spectra the significant product signals are present in the chemical shift range of +23 ppm to −13 ppm, −18 ppm to −33 ppm, and −73 ppm to −93 ppm.

28. The process according to claim 24, wherein the polysilanes are prepared by a plasma-chemical process which have at least one direct Si—Si bond and whose substituents consist of halogen or of halogen and hydrogen and in whose composition an atomic ratio of substituent to silicon is at least 1:1, where a) the halogen is chlorine, b) hydrogen content of the polysilane is less than 2 atom %, c) the polysilane contains substantially no short-chain branched chains and rings, an amount of branching sites of a summed fraction of perhalogenated derivatives of neohexasilane, neopentasilane, isotetrasilane, isopentasilane, and isohexasilane, based on an overall product mixture, being less than 1 mol %, d) it has a RAMAN molecular vibration spectrum of I100/I132>1, where I100 is the Raman intensity at 100 cm-1 and I132 is the Raman intensity at 132 cm-1, e) in $^{29}$Si NMR spectra it has its significant product signals in the chemical shift range of +15 ppm to −7 ppm.

\* \* \* \* \*